July 17, 1928.

S. ARTON

CASH REGISTER

Filed May 15, 1922

Inventor,
Sven Arton.
By-
Rummler & Rummler
Attys.

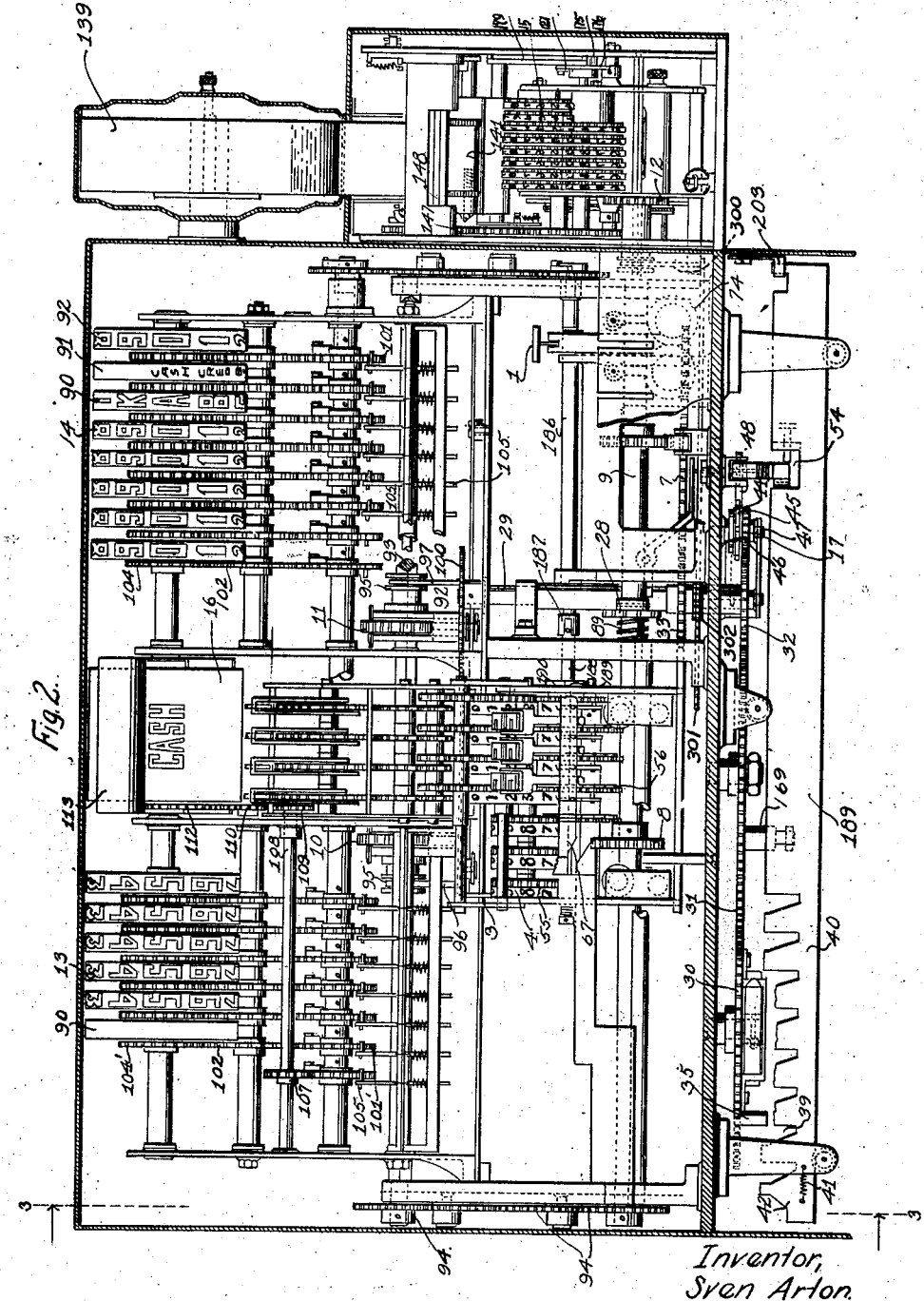

July 17, 1928.

S. ARTON

CASH REGISTER

Filed May 15, 1922

Inventor,
Sven Arton.

By-
Rummler & Rummler
Attys.

July 17, 1928.

S. ARTON 1,677,510

CASH REGISTER

Filed May 15, 1922     8 Sheets-Sheet 4

Inventor,
Sven Arton.

By-
Rummler & Rummler
Attys

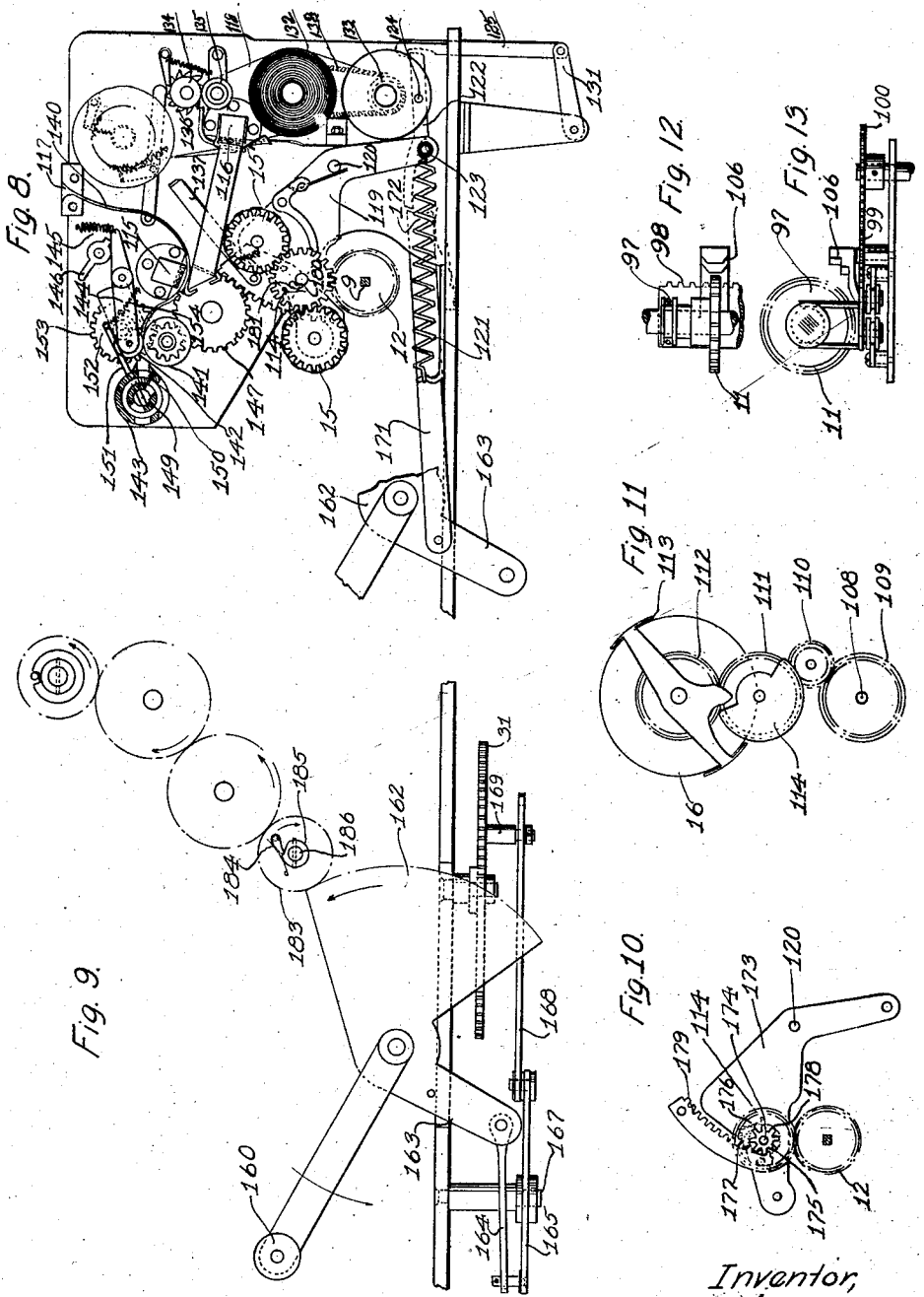

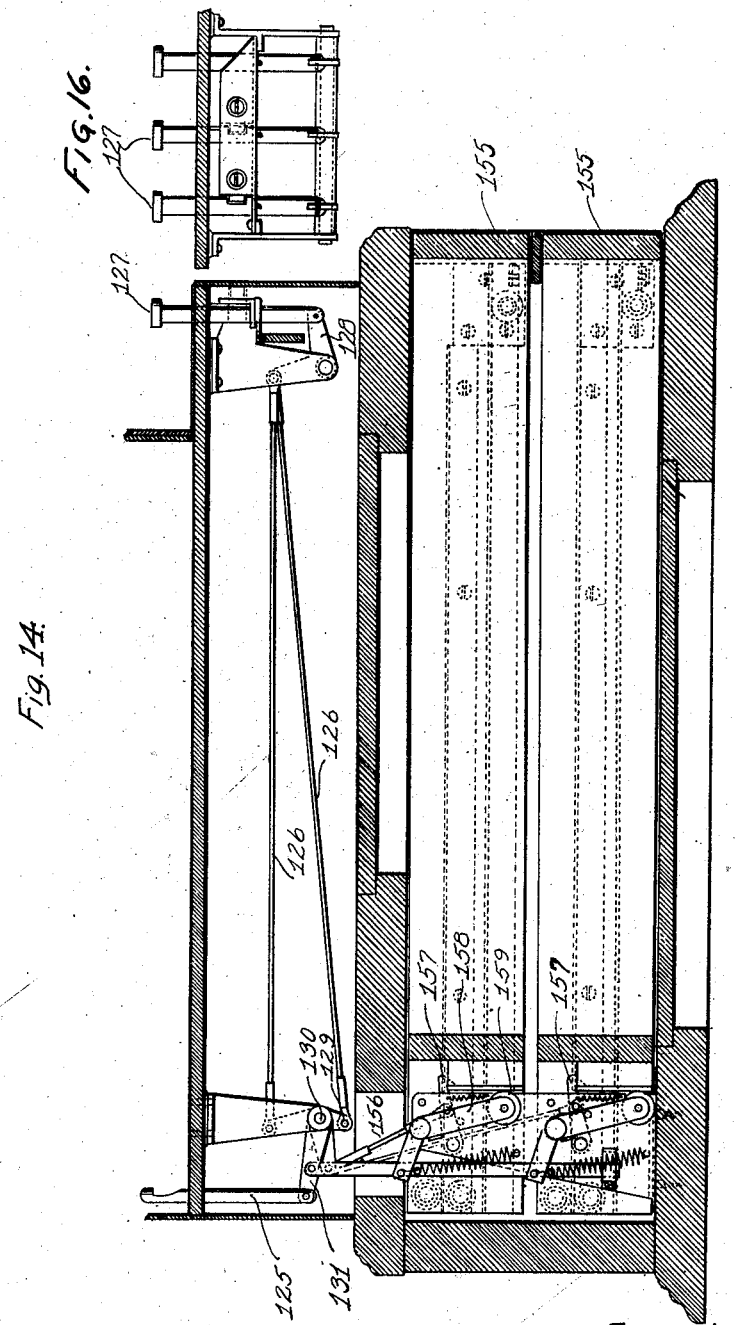

July 17, 1928.  1,677,510
S. ARTON
CASH REGISTER
Filed May 15, 1922   8 Sheets-Sheet 7
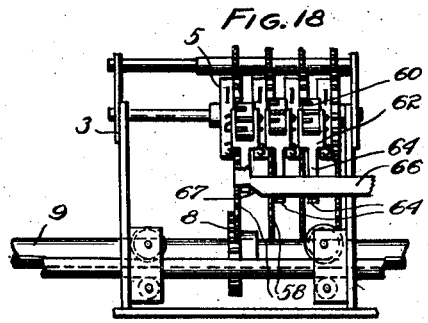
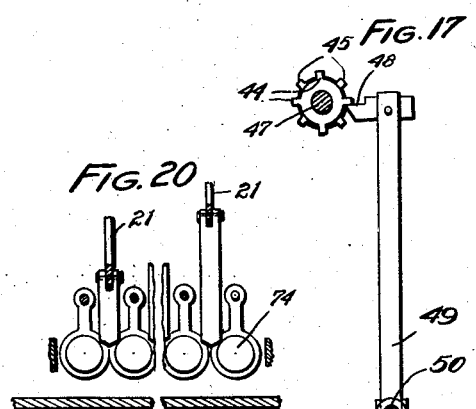
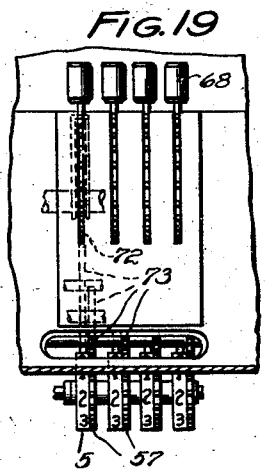
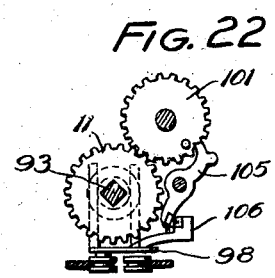
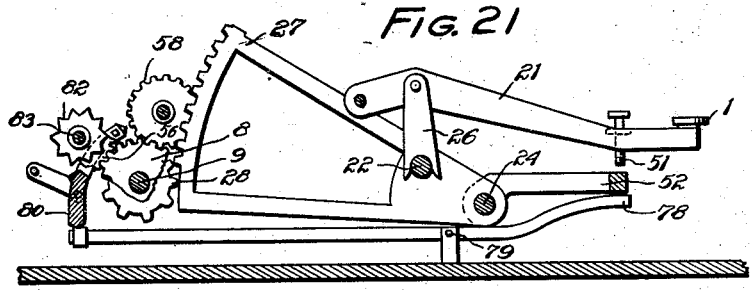
Inventor
Sven Arton
Rummler & Rummler
Attys July 17, 1928.
S. ARTON
CASH REGISTER
Filed May 15, 1922
1,677,510
8 Sheets-Sheet 8
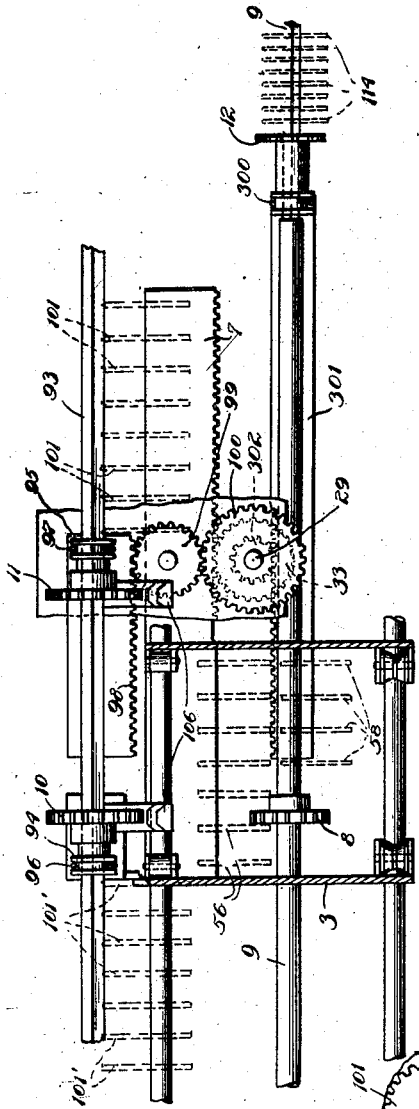
Inventor
Sven Arton
Rummler & Rummler
Attys Patented July 17, 1928.

1,677,510

UNITED STATES PATENT OFFICE.

SVEN ARTON, OF CHICAGO, ILLINOIS.

CASH REGISTER.

Application filed May 15, 1922. Serial No. 560,967.

This invention relates to accounting machines and is of the general class known as ten-key machines, wherein the totalizer or a carriage, intermediate the totalizer and actuating keys, is movable step by step between successive operations of the keys in order to effect the successive differential setting of different denominational elements of the totalizer or accounting device. One of the chief characteristics of the present machine as distinguishing it from prior ten-key machines is the application of the ten-key principle to cash registers in a way that makes these ten keys successively serve as value, clerks, department, classification, or other special keys. The motion of the traveling carriage under the control of the escapement mechanism controls the position of a long indicating drum, extending over the keys and carrying indicia which indicate the function of each key in the different positions of the traveling carriage. It is, therefore, a main object of this invention to provide a cash register with ten keys, which are serviceable not only for determining the values entered in a totalizer, but also for determining the classification of transactions, such as cash, paid out or credit, and such functions as registering the initial designating the clerk who made the transaction, or the class of goods sold. It is also the purpose of the invention to provide a key mechanism so related to the accounting devices which are actuated by the keys, that one such accounting device will be operated upon the downward stroke of the key, and another accounting device will be operated in a corresponding manner upon the return stroke of the key.

It is also an object of the invention to provide transaction, department, clerks, and special counters, which automatically become operative only when the traveling carriage is in a position where the keys become effective for entering such special information in regard to a transaction.

A further purpose of the invention is to provide normally inactive keys, the depression of which will have no effect on the accounting or registering mechanisms, but which become effective only upon an essential preliminary operation of another part of the machine. It is also an object of the invention to provide certain specific improvements in the receipt and detail printing mechanisms such as both a drawer controlled and separately controlled release for the impression taking means, an improved check or receipt cutting device, and an improved means for resetting the type wheels.

Further improvements to which the invention relates are means for controlling carrying mechanism for a totalizer whereby the different denominational elements of the carrying mechanism are moved successively into active position as the totalizer moves from right to left, and its denominational elements are rendered successively operative with respect to the controlling keys. It is a general object of the invention to lighten the action of the machine by having nearly all of the mechanism normally inactive and rendering operative such mechanism as must be moved in order to enter a transaction, only according to the movements of the carriage with respect to the controlling keys.

The objects of the invention are accomplished by the device shown in the accompanying drawings, in which—

Fig. 2 is a front view of the machine, but with the cabinet and most of the keys, and certain other parts shown broken away in order to clearly illustrate as much as possible the essential parts of the operating mechanism.

Fig. 8 is an end view of the printing mechanism viewed from the right of Fig. 2, but with its casing omitted.

Fig. 9 is also a detail viewed from the right of Fig. 2, showing the operating handle, by means of which the carriage is restored to normal position, and other functions performed.

Fig. 10 is another detail viewed from the right of Fig. 2, and illustrates the method of resetting the type wheels to zero position.

Fig. 11 is a detail in side elevation illustrating the shutter action for the indicators.

Figures 12 and 13 are respectively details in plan and side elevation of a controlling device which serves to hold out of action zero stops for the indicators when the latter are operated.

Fig. 14 is a transverse sectional detail illustrating the cash drawer operating mechanism.

Fig. 16 is a front view of the drawer keys, also shown in Fig. 14.

Fig. 17 is taken from Fig. 1 and is a plan view of the escapement members.

Fig. 18 is a front elevation of a portion of the traveling carriage member and is taken from Fig. 2.

Fig. 19 is a front elevation of a fragment of the casing showing the amount tendered keys.

Fig. 20 is a detail view of parts of the key interlock mechanism which is shown in dotted lines in Fig. 2.

Fig. 21 is a view similar to Fig. 4 with parts omitted and parts shown in full.

Fig. 22 is a view similar to Fig. 13 with parts added.

Fig. 23 is taken from Fig. 1 with parts omitted and parts shown in full, to more clearly show the relationship of different members.

Fig. 24 is taken from Fig. 3 with parts omitted and parts shown in full.

Fig. 25 is a view similar to Fig. 8 showing only a portion of the parts.

Figure 1:
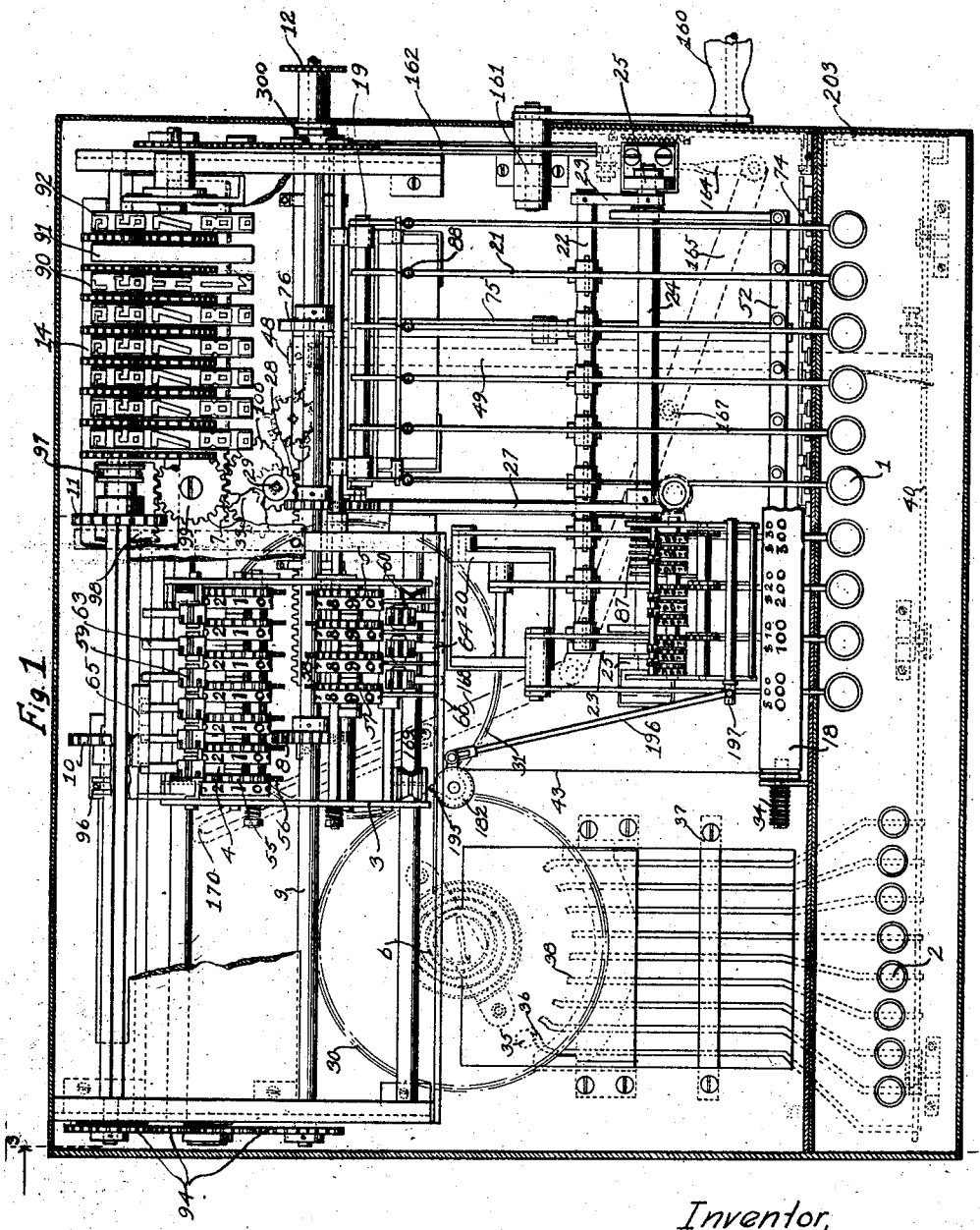
Figure 1 is a plan view of the machine with the casing removed, the printing mechanism and certain indicators omitted, and other parts broken away for the sake of clearness.

Substantially the entire machine is illustrated in this application for patent in order to make clear the relationship between such mechanisms which are herein claimed, with other more or less independent mechanisms which may be useful in cash registers of different general design. The machine as illustrated comprises indicators and printing devices, and other customary devices, such as counters, etc., and for the sake of clearness of illustration only one totalizing device, although a plurality of totalizers may be successfully incorporated in the machine, a set of ten controlling keys, a set of tabulator keys in order to save operations of the zero key of the controlling keys for the purpose of positioning the traveling carriage as desired, a plurality of cash drawers, and an operating handle for restoring the carriage to starting position. The machine is key-operated, that is, a depression of a key does not control the subsequent operation of the differential mechanism, but serves to directly transmit the desired motion to the totalizer, indicators and type wheels. Preliminary to operation of the controlling keys, the traveling carriage may be set to any desired position by a depression of one of the tabulator keys. The totalizer is preferably mounted in the traveling carriage, moving from right to left with the carriage so that its different denominational elements successively come into active relationship with the stationary differential mechanism, the higher order elements being operated before the lower order elements. The indicators and type wheels are also successively set by means of master gears which are slidable both to left and right upon the left hand movement of the totalizer carriage in order to properly set front and rear indicators, and also for successively setting type wheels, and also setting in a subtracting direction the denominational elements of a change indicating device, which, preliminary to the operation of the machine may have been set in a forward direction according to the amount tendered. This change indicating device is, of course, not intended for use upon entering all transactions, but only occasionally when the amount involved is large enough to cause the clerk to desire to avoid a mental calculation of the change.

Referring to the drawings, the ten controlling keys 1 serve for differentially setting the accounting devices, and any special, clerks, departments or other classification in type wheels and indicators. Keys 1 and tabulating keys 2 both serve the function of differentially positioning a traveling carriage 3. This carriage supports a totalizer 4, and a change indicator 5. The carriage is caused to travel from right to left by a spring motor 6, with a geared connection to the rack 7, rigid with the carriage. The denominational elements of the totalizer 4 and the change indicator 5 are successively set differentially by a master pinion 8, fixed to a shaft 9, which shaft is differentially rotated through connections with keys 1. Master pinions 10, 11, and 12 are so connected with the carriage as to be moved in the proper direction for successively coming into coaction with the different denominational indicating and type wheels 13, 14, and 15. A central classification indicator is shown at 16, Fig. 2, and in this figure the escapement mechanism for determining the motion of the carriage under control of keys 1 or 2, is generally indicated by the numeral 17. The specific construction of the above generally indicated parts of the machine will now be described.

*The keyboard and the escapement mechanism.*

The depression of any one of controlling keys 1 results in the turning of differential shaft 9 a number of degrees, according to the value of the particular key depressed, and in order that these key levers may have a substantially uniform stroke while turning the shaft 9 differentially, they are preferably mounted in two groups, the first six keys to the right, Fig. 1, being pivotally supported at their rear ends on a horizontal shaft 19, and the remaining four keys being pivotally mounted on the upper ends of the brackets 20, which are spaced forwardly of the shaft 19. Extending transversely below all of the key levers 21 and forwardly of their pivotal supports, is a bar 22, supported for oscillation by being rigidly connected through arms 23 with a shaft 24, mounted in bearings 25. Depending from each key above the rod 22, is a forked member 26. These members 26 being of different distances from the pivotal supports of their separate key levers determine the extent of oscillation of shaft 24 under the action of the keys. This shaft carries rigidly a gear sector 27, meshing with a pinion 28, fast to differential shaft 9. The differential shaft serves to transmit motion from the keys to the totalizer, change indicators, sales indicators, and the registering mechanism.

The motion of the traveling carriage 3, within which are mounted the totalizer and change indicators, is controlled either by the keys 1 or the tabulating keys 2, through escapement 17 on a vertical shaft 29, Figures 1 and 2, which is driven by spring motor 6 through the gears 30, 31 and 32. Gear 32 is secured to the lower end of shaft 29, Fig. 2, while a gear 33 secured to the same shaft meshes with rack 7, fast to the carriage 3. The gear 30 has a downwardly extending pin 35, which normally engages a zero stop 36, in the form of a key lever, and pivoted with keys 2 on a support 37.

When a tabulating key 2 is depressed, its end 38 is raised into the path of pin 35, while a reverse motion is imparted to the zero stop 36, this stop rocking downwardly away from the pin. In order to move the rear end of stop 36 downwardly when a key 2 is depressed, these keys coact at their forward ends with inclined surfaces 39, formed on a sliding bar 40. Thus, upon the depression of a key 2, the bar shifts to the left against the action of a spring 41 and the inclined surface 42 on this bar engages the forward end of the zero stop, raising it so that its rear end moves away from pinion 35. The carriage 3 now moves to the left until stopped by pin 35 engaging the depressed key.

In order to avoid the use of keys 2 except for the initial positioning of the carriage, the escapement mechanism 17, Fig. 2, for the carriage is under the control of keys 1. This escapement mechanism consists of a pair of escapement wheels 44 and 45, rigid with a pinion 46, meshing with gear 32 on the vertical shaft 29. These escapement wheels and pinion 46 are rotatably mounted upon the depending stub shaft 47. A pawl 48 coacts with the escapement wheels 44 and 45. This pawl is carried on the rear end of a lever 49, pivoted on a swivel support 50, Figures 4 and 5, in order to rock in both a vertical and horizontal plane around this swivel or universal pivot. The keys 1 oscillate the lever 49 in a vertical plane by having pins 51, which engage a yoke 52, supported for oscillation around shaft 24. The lever 49 is provided with an upwardly extending pin 53 in position to be engaged by yoke 52 upon the depression of a key 1. By this motion of lever 49 in a vertical plane, the pawl 48, which the lever carries at its rear end, is moved out of engagement with escapement wheel 45, and into the path of a tooth on escapement wheel 44, thus permitting shaft 29 to rotate sufficiently to shift the carriage one-half of a denominational step.

When one of the keys 2 is depressed, the carriage is freed from the escapement mechanism since the pawl 48 is moved horizontally out of engagement with the escapement wheel 45 by a swinging motion of lever 49 in a horizontal plane. This motion of the lever is effected by engagement of a key 2 with one of the cam surfaces 39 on bar 40. The bar 40, near its right hand end, Fig. 2, is notched out at 54 to receive the forward end of bar 49.

*Totalizer and change indicator.*

The totalizer 4, which is mounted upon the traveling carriage 3, consists of the usual series of numbered drums having gears 55, which receive motion from the gear 8, rigid on the differential shaft 9, but through the intermediate gears 56, which successively come into mesh with the gear 8 during the lateral motion of carriage 3.

The change indicator 5 also consists of the usual series of numbered drums rigid with gears 57, in turn meshing with intermediates 58, which also come successively into mesh with gear 8.

The carrying devices for both the totalizer 4 and change indicator 5 consist of stop pinions 59 and 60 pivotally mounted on the upper ends of bell-crank levers 61 and 62. These bell-crank levers have arms 63 and 64, engaging horizontal bars 65 and 66, supported on the machine frame, but each being cut out as indicated at 67, Fig. 2, to provide an inclined track which permits the carrying pinions to successively move out of engagement with the totalizer gears 55 and the change indicator gears 57 as the arms 63 and 64 of the bell-cranks supporting pinions come into coaction with these inclined guides due to the motion of the carriage. Thus, each wheel of the totalizer and the change indicator is freed from its lower order carrying pinion only at the time of receiving motion from gear 8.

When the change indicator is used to show the amount of change due a customer, then it is, of course, preliminary to the subtracting operation first set to indicate the amount tendered by the customer. It is so set in an adding direction by pressing one of the buttons 68, Fig. 3, inwardly against the action of a spring 69 at the upper end of setting levers 70. This motion engages a sliding tooth 71 in the setting lever, with a gear 72. Then the setting lever is drawn forwardly and downwardly until its corresponding change indicator registers the amount tendered. The motion from button 68 is transmitted to the change indicator through the intermediate gears 73.

Differential mechanism.

The differential mechanism has been generally described in connection with the keyboard, this mechanism consisting principally of the sector gear 27, which is differentially movable under the action of the keys 1, gear 28 with which the sector gear meshes, shaft 9 carrying the gear 8 for setting the totalizer elements, and the gear 12 for setting the type wheels. When a key 1 is depressed, shaft 9 is rotated according to the value of the key, only one key being depressible at a time due to the use of key arresters 74.

Figure 4:
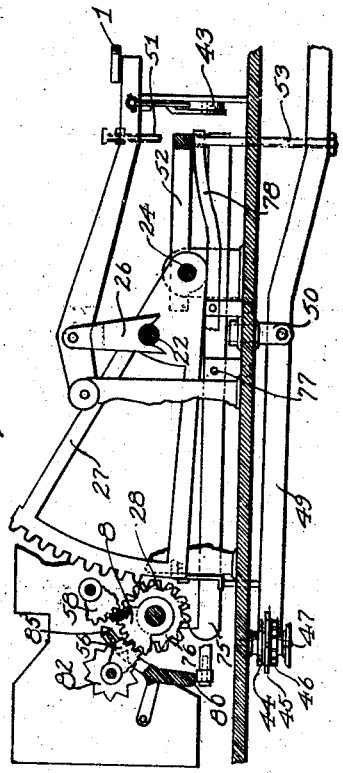
Figures 4 and 5 are details in side elevation respectively illustrating the normal and moved position of the operating keys and differential mechanism controlled thereby.
Figure 5:
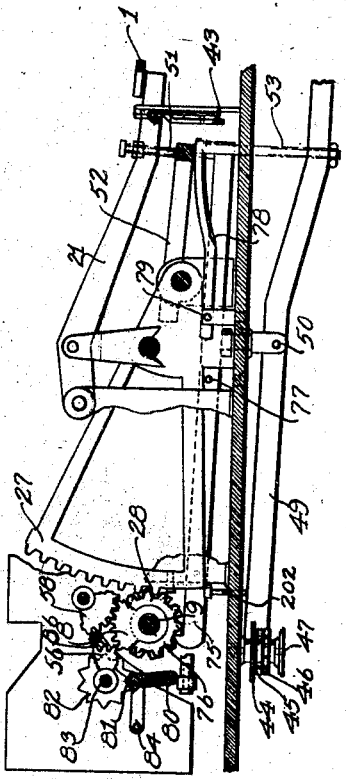

The differentially movable gear sector 27 is positively limited in action by pawl 75, Figures 4 and 5, which is engaged between the teeth of a wheel 76 on shaft 9 as the depressed key 1 nears the bottom of its stroke, at which time yoke 52 depresses the forward end of pawl 75, the pivot 77 of the pawl being substantially midway between its ends.

Yoke 52 at the same time operates a lever 78, pivoted at 79 so that the rear end of the lever engages a pivoted alining device 80 for the totalizer 4 and the change indicator 5. This alining device is in the form of a toothed bar 81, the teeth of which project upwardly from the bar so as to be capable of engagement with star wheels 82, rigid with the intermediate gears 56 on shaft 83. The alining device 80 is pivotally supported at 84. It also is pivotally connected with an alining device 85 for the change indicator. The alining device 85 is slidable along a fixed pin 86 extending through a slot therein. The alining device 85 coacts with the teeth of intermediate gears 58 for change indicator 5.

Figure 3:
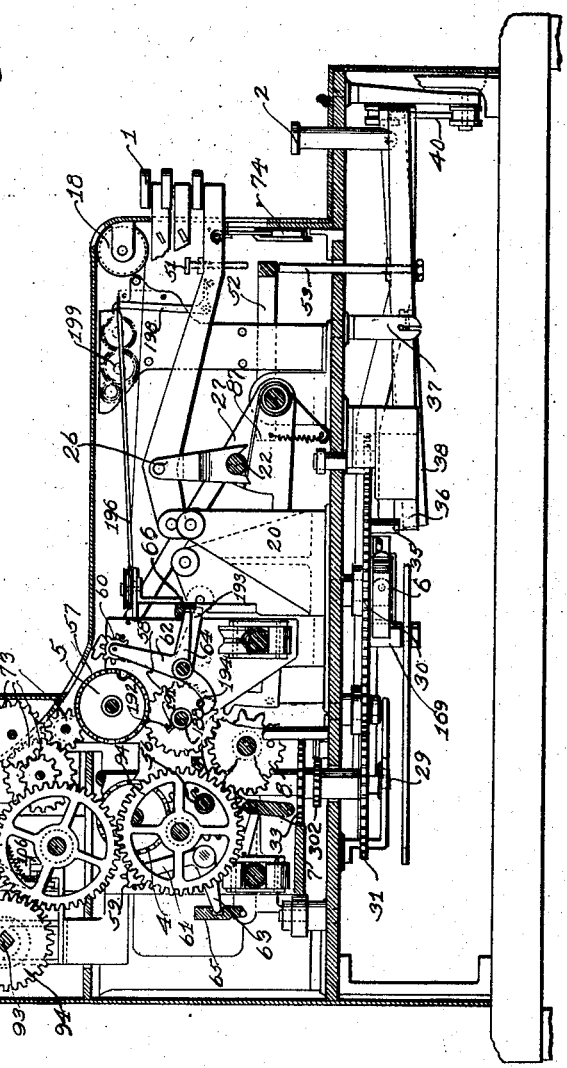
Fig. 3 is a transverse vertical sectional view taken on the line 3—3 of Figure 1.

The keys 1 and the sector 27 are restored to normal position by spring 87, Fig. 3, although the keys are also each provided with separate restoring springs 88, Fig. 1. The differential shaft 9 is restored by means of a spring 89, one end of which is secured to gear 28, the other end of the spring being secured to the frame of the machine.

When a key 1 is depressed the gear 8 on the differential shaft serves to transmit the motion to the totalizer and to the change indicator, but when the key arrives at the bottom of its stroke it operates the escapement mechanism 17, permitting the carriage 3 to travel one-half a denominational step to the left, in which position of the carriage gear 8 becomes ineffective as to the totalizer and change indicator, but the indicator setting gears 10 and 11 are then rendered effective with respect to the indicators in groups 13 and 14, Fig. 2. Therefore, upon release of the depressed key the differential shaft 9 is reversely rotated under the action of springs 87 and 89 to its original setting. Indicator drums are rotated to indicate an amount corresponding to that which had been received by one of the totalizer wheels upon the depression of the key.

Indicators.

Figure 15:
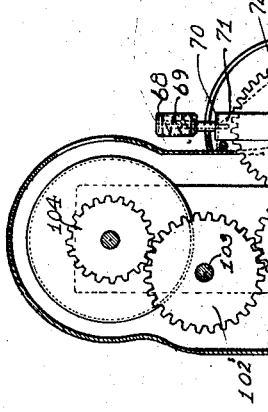
Fig. 15 is a diagram of the lettering on the key indicating drum.

A peculiarity of the present machine is that the function of the controlling keys 1 changes upon successive operations of these keys. They are first serviceable in operating the totalizer and change indicator, but after the traveling carriage 3 has moved far enough to successively engage the different denominational elements of the totalizer with the master gear 8, the keys 1 become ineffective with respect to the totalizer and change indicator, and then successively serve as clerks' keys, transaction keys, and if desired for other special purposes. In order to indicate the function of the keys 1 in all the different positions of the carriage, a key indicating drum 18 is closely associated with the key heads, and this drum is normally held in its zero position by the coiled spring 34. It has a cord connection 43 with the traveling carriage 3 so as to be rotated against the action of spring 34 as the carriage travels to the left. The drum is lettered for the purposes of the machine, as herein illustrated, in the manner shown in Fig. 15, which represents the drum as it would appear if split longitudinally and flattened out. As shown in this figure the key indicating drum not only serves to indicate the changing function of keys 1, but also their changing denominational value during the operation of the totalizing device.

The indicators comprise value indicating wheels 13 and 14, in two groups for respective reading at the front and rear of the machine. At the side of the group of wheels 14, is a clerk's initial wheel 90, the transaction indicator 91, and a special indicator 92. The indicators 13 and 14 are successively set by the gears 10 and 11, slidably mounted on a square shaft 93, Figures 2 and 3. This shaft is differentially rotated by means of a geared connection to shaft 9, comprising the group of gears 94, indicated at the left of Fig. 2. The gears 10 and 11 each have grooved hubs 95, which are engaged by forks 96 and 97. The fork 96 is rigid with the carriage frame 3, but the fork 97 is carried by a rack 98. This rack is horizontally disposed and moves in an opposite direction to the motion imparted to carriage 3 by the rack 7 through the vertical shaft 29, escapement mechanism, and the geared connection to the spring holder 6. The rack 98 is driven through the same connections except that it is geared to shaft 29 through the intermediate gear 99, meshing with the gear 100 fast to the shaft 29. The gears 10 and 11 slide into engagement with gears 101' and 101 respectively. After the carriage 3 shifts a half step to the left upon the completion of a down stroke of a key 1, then upon the return stroke of the key the totalizer and change indicator are not affected, but the indicator drums corresponding to the position of the gears 10 and 11 are set according to the value of the key. Motion is transmitted to the indicator drums from the gears 101' and 101, through the intermediate gears 102' and 102 respectively loose on shaft 103, Fig. 3. The gears 102' and 102 mesh respectively with the gears 104' and 104, fast to the indicator drums. The indicator drums are normally locked against rotation by spring actuated detents 105, but when any one drum is being rotated its respective detent 105 is disengaged by a cam 106, Figures 12 and 13. One such cam is movable with each of the wheels 10 and 11.

The indicators 13 and 14 are successively actuated, and then the gears 10 and 11 come into position for operating the clerks' indicators 90. After these indicators are set the gear 11 successively comes into position for operating the transaction indicator 91 and the special indicator 92. The central transaction indicator 16 receives motion from the gear 10 through one of the gears 101, gear 107, shaft 108, and gears 109 to 112, Fig. 11.

The flash 113 for this indicator is operated by a cut away disk 114, Fig. 11, rigid with the gear 111. This serves to permit a reading of indicator 16 during its first four positions, but thereafter the flash or shield 113 covers the indicator in any one of its five remaining positions, while the corresponding indicator 91 in the clerks' group to the right, Fig. 2, will continue to indicate on the clerk's side of the register.

*Printing mechanism.*

The gear 12 by which differential motion is transmitted to the different type wheels in succession rotates with the differential shaft 9. The gear 12 is also slidable along the square end of shaft 9 in order to operate the different type wheels. For this purpose the hub of gear 12 is grooved to receive a fork 300, Figs. 1 and 2. This fork is carried by rack 301, Fig. 2, which rack is shifted the desired extent and in the proper direction upon operations of escapement 17, by a pinion 302, fast to the vertical shaft 29, which, as previously described, is also utilized for shifting the totalizer carriage and also for shifting the master pinions 10 and 11 into positions for successively operating the different indicating drums.

The printing mechanism consists of two sets of type wheels 15 and 15', Fig. 8, each receiving motion from the gear 12 through one of the intermediate gears 114. These two sets of type wheels coact with the platens 115 and 116 respectively, for making impressions on receipt paper 117, and a detail strip 118. The type wheels are carried on a frame 119, which is mounted to oscillate around a shaft 120. This frame is urged to rock in the proper direction to take an impression by the spring 121, but is normally locked against motion by the arm 122, projecting over a rod 123, extending between side members of frame 119 and 15'. This arm is pivoted to the frame of the machine at 124, and its rear end is normally engaged by a latch 125. This latch may, of course, be released by any automatic means connected with the operating mechanism of the register, but as illustrated it is connected by links 126, Fig. 14, with cash drawer keys 127, through the bellcranks 128 and 129, adapted to independently oscillate shaft 130, which carries an arm 131 pivoted to the lower end of latch 125.

One extra key similar to the drawer keys is provided as shown in the detail at the right of Fig. 14, in order to permit the release of the impression taking means independently of the release of one of the two cash drawers with which the machine is shown as provided.

The strip of detail paper 118, Fig. 8, is fed from a supply roll 132, past the platen 116 and to the receiving roll 133, by means of a pair of feed rolls 134 and 135. Roll 134 carries a ratchet 136, which is engaged by a pawl 137, carried by the segment gear 119. On the return stroke of the segment gear after an impression is taken the pawl 137 serves to rotate the feed roller 134 to the left. The paper roll 132 is rotated by the drag of the paper and through a spring belt 138, which serves to rotate the receiving roll 133.

The check or receipt paper is led from a supply roll 139 through the guide 140, and passing below the platen 115 between feed rollers 141 and 142, and then outwardly through apertures in the check cutting device 143. The idle feed roller 142 is carried by an arm 144, and is held in engagement with the feed roller 141 with the desired pressure by means of spring 145. The throw-out device 146 for the check feeding mechanism coacts with the arm 144. The feed roller 141 is driven by means of the geared connection 147 with sector gear 119. This gearing is idle on the up stroke of the sector 119 due to the ratchet connection 148 shown in Fig. 2, and comprises a spring pressed plunger in feed roller 141, and coacts with a notched collar on one of the gears 147. Upon the down stroke of this sector the check is fed the required distance.

The check is cut from the strip by an oscillating hollow cylinder 149, equipped with the knife-edge 150. An arm 151 extends rearwardly from cylinder 149, and at its rear end is engaged by an oscillating arm 152, having a pin and slot connection with a gear 153 meshing with the gear 147. Thus, as gear 153 is oscillated the arm 151 is operated to first permit the check paper to be fed through the check cutting device, and then under the action of spring 154 the arm 151 rocks downwardly causing the cutting of the check by knife 150.

Cash drawers.

Cash drawers 155, shown in Fig. 14, are released by the separate keys 127, these each having connections through bell-cranks 128, rods 126, and bell-cranks 129, with links 156 connected with the spring retained drawer latches 157. When one of these latches is lifted by the depression of a key 127, the corresponding drawer is pushed forwardly by the spring-operated bell-crank lever 158, having a roller 159 for engaging the rear end of the drawer.

Restoring mechanism.

The operating handle 160, Figures 1 and 9, has connections for rewinding the motor spring 6 for the carriage 3, at the same time restoring the carriage to its initial position, and it also has connections for resetting to zero all of the indicators including the change indicator 5 and the key indicator 18, and for resetting the type wheels. This operating handle is in the form of a lever pivoted in a bearing 161 and rigid with a segment gear 162, having a depending arm 163, which is connected by means of a link 164 with a horizontally disposed lever 165, pivoted to the machine frame at 167 and also pivotally connected at its opposite end with a slotted arm 168. A pin 169 on gear 31 extends through this slot. Accordingly, when this gear rotates to the right, Fig. 1, upon the left hand motion of carriage 3, the pin idly rides along the slot in arm 168, but when operating handle 160 is drawn downwardly to complete an operation of the machine, the pin 169 is engaged by the closed end 170 of arm 168 and the gear is restored to its normal position, thus reversely moving the carriage back to its extreme right hand position and through the gear 30 rewinding spring motor 6.

The same downward motion of operating handle 160 serves to restore the frame upon which the two sets of gears 15, Fig. 8, are mounted. This is effected by means of the sliding arm 171, pivotally connected to the depending arm 163 of the segment gear 162, and being suitably shaped at its rear end 172 to engage the rod 123 extending between the end members of the type wheel supporting frame. One of these end members is the segment gear 119, and the remaining end member 173 of this frame is shown in Fig. 10. This figure shows that the shaft 174 which supports the intermediate gears 114 between the two sets of type wheels 15, supports a pinion 175. This pinion is loose on the shaft, but carries a disk 176, upon which is mounted a pawl 177 for engagement with a notched disk 178, fast to shaft 174. The pinion 175 meshes with a stationary curved rack 179, and when the type wheel frame swings upwardly at the time of taking an impression, the pawl 177 idly rolls over the disk 178, but on the restoring motion of the printing frame the pawl engages the disk and rotates shaft 174 in the proper direction so that shoulders 180 on the shaft, Fig. 8, engage pawls 181 on the intermediate gears 114, thus restoring these gears to their original position, and thereby the two sets of type wheels 15.

The change indicator and the remaining indicators except the key indicator 18 are restored to normal position upon the upward motion of handle 160, which does not take place until the entry of another transaction into the machine. The change indicator 18 is restored to normal position by the spring 34, Fig. 1, upon the restoring motion of carriage 3, which then allows the cord 43 to be wound upon the change indicator as it is permitted to pass around stationary pulley 182.

Resetting the change indicator is effected by a gear 183, Fig. 9, meshing with sector gear 162. This gear carries a pawl 184, which idly rides over a notched disk 185, pinned to shaft 186 upon the downward motion of handle 160, but when this handle is lifted preliminary to an entry of another transaction the pawl engages the notched disk 185, rotating shaft 186 to the left. This shaft, Fig. 2, has a sliding coupling 187 with the coaxial shaft 188, which shaft loosely supports the intermediate gears 58, Fig. 3, these gears meshing with the gears 57 which carry the numbered drums of the change indicator. When shaft 186 is thus rotated to the left a pin 189 on shaft 188 rides out of a notch in a fixed disk 190, causing the shaft 188 to shift slightly to the right, Fig. 2, bringing projecting pins 191 thereon into the path of pins 192, Fig. 3, on the intermediate gears 58. By this engagement of the pins the gears 58 and change indicator drums are restored to zero position.

The carrying devices 60 for the change indicator are, during the resetting operation, held out of engagement with the gears 57 by the bar 66, Fig. 3. This bar also serves, when the carriage is in its extreme right hand position, to place zero stops 193 into the paths of pins 194 for the gears 58, thus preventing overthrow on the resetting operation.

This resetting of the change indicator does not effect the setting of the totalizer 4, since the only connection between the totalizer and the change indicator is the differential gear 8, which is normally inactive with respect to both of these accounting devices.

Special counters.

When the carriage 3 has been moved to the left far enough to make the differential mechanism effective with respect to the transaction indicators, the right hand frame member of this carriage engages a bellcrank lever 195, Fig. 1, thus drawing a rod 196 rearwardly and causing a yoke 197 to which this rod is connected, to engage counter actuating pawls 198, Fig. 3, rendering these pawls effective with respect to the special counters 199. One of these counters will, therefore, be operated upon the down stroke of a key 1 in this position of the carriage.

Operation.

Preliminary to the operation of the keys 1 and 2 in entering a transaction, its is necessary for the operator to restore the indicators by moving the operating handle 160 to its upper normal position, as indicated in Fig. 9. Otherwise the machine will remain locked by latch 203 (Figs. 1 and 2) movable with the operating handle and the gears 30 and 31 could not rotate under the action of spring 6 since the slotted link 168, Fig. 1, by engagement with the pin 169 on gear 31 prevents such action. The down motion of the handle also cannot be effected unless the printing mechanism has been operated to register the previous transaction, as the latch 122, Fig. 8, in its normal position, serves as a stop, its forward end being in the path of slide 171, which is connected with the sector gear 162, rigid with the operating handle gear 160. By the restoring motion of the handle, carriage 3 is shifted to normal position and the key indicator 18 is permitted to reversely rotate to its normal position under the action of spring 34. Likewise, all of the remaining indicators and type wheels are reset to zero position as previously described in detail.

Figure 6:
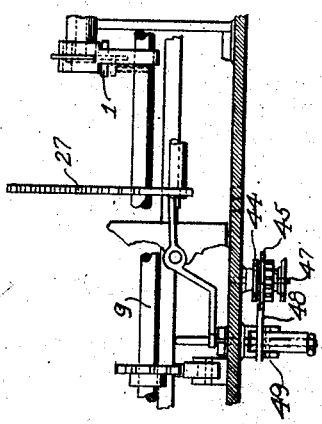
Figures 6 and 7 are respectively rear views of the mechanism shown in Figures 4 and 5.
Figure 7:
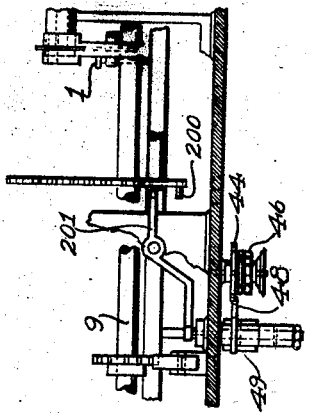

Assuming that the customer tendered a ten dollar bill and the clerk desires to have the change indicator show the amount of change due the customer, he sets the change indicator through one of the levers 70, Fig. 3, to indicate ten dollars. Then he depresses a key 2 according to the largest denominational value of the sale. The depression of this key permits carriage 3 to shift to the left to the correct denominational position. Since the carriage in this motion draws upon the cord 43, the key indicator 18 is rotated so as to indicate the value of all of the keys 1 in this denominational position of the carriage. Then, upon the depression of one of the keys 1, the sector gear 27, Figures 4 and 5, is forced downwardly according to the value of the key, thus rotating gear 8, Fig. 1, and setting the amount in the corresponding wheels of the totalizer 4, change indicator 5, through their respective connections with the differential shaft 9. At the completion of the downward stroke of one of the keys 1 operating lever 49 is rocked to disengage pawl 48, Fig. 6, from the escapement wheel 45, and bring it into the path of a tooth on escapement wheel 44, Fig. 7. This permits the carriage to shift one-half denominational step to the right. Then, upon the up stroke of the depressed key, the gears 10 and 11 become effective for setting the value of the key into one of the drums of each of the sets of indicators 13 and 14. After this is accomplished and the key 1 and sector 27 arrive at their original positions, a pin 200, Fig. 7, on sector 27, engages a pivoted arm 201, thus causing a pin 202 at the opposite end of the arm to engage the escapement lever 49, pressing this lever back to its original position, the pawl 49 becoming disengaged from escapement wheel 44 and again engaged with escapement wheel 45. This downward motion of the pawl permits the carriage to move to the right, Fig. 1, a further one-half step. The differential gear 8 then is in position to engage the wheels of the totalizer 4 and change indicator 5 of next lower order. After the amount of the transaction is in this manner entered into the totalizer and at the same time entered into the change indicator 5 in a subtracting direction, the key indicator drum 18 next indicates the clerks' letters, corresponding to each of the keys 1, and these keys are now effective for registering and indicating the initial of the clerk who had charge of the transaction. The keys 1 may then become successively effective for the work of entering the class of the transaction or any desired special information. Next the drawer key 127 is depressed thus releasing the drawer and effecting the detailed impression upon the record and receipt strips. Finally the operating handle is depressed and thereby restoring the carriage to its original position, where the change indicator may be read.

I claim:

1. A machine of the class described comprising accounting and indicating devices, an operating mechanism for said devices, a set of keys for controlling said operating mechanism, said accounting and indicating devices, operating mechanism and keys being so arranged that successive depression of said keys results in changing the denominational value of the entry and likewise changing from one class of entry to another, and an indicator extending across all the keys and having a step-by-step movement to successively indicate the changing value and function of the keys.

2. A machine of the class described comprising accounting and indicating devices, an operating mechanism for said devices, a set of keys for controlling said operating mechanism, said accounting and indicating devices, operating mechanism and keys being so arranged that successive depression of said keys results in changing the denominational value of the entry and likewise changing from one class of entry to another, and a rotary indicator extending across all the keys and having a step-by-step movement to successively indicate the changing value and function of the keys.

3. A machine of the class described comprising accounting, recording, and indicating mechanisms, a single set of controlling keys for all mechanisms, means operable upon successive operations of said keys for successively bringing about coaction between said keys and different denominational elements of one of said mechanisms and then coaction between said keys and another of said mechanisms, and a set of tabulating keys controlling said means to determine with which of said mechanisms the controlling keys are first connected.

4. A machine of the class described comprising an accounting mechanism, an indicating mechanism, a set of ten keys which operate said accounting and indicating mechanisms, and means for alternately connecting said keys with said accounting and indicating mechanisms whereby one of said mechanisms is operated upon the down stroke of a key, and the other of said mechanisms is operated upon the return stroke of the key.

5. A machine of the class described comprising a set of front and a set of rear indicators, a set of controlling keys, means for successively connecting keys with corresponding indicators of each set of indicators upon successive operations of the keys, said means comprising indicator actuators which are slidable in opposite directions into successive coaction with different indicators of each set of indicators.

Signed at Chicago this 9th day of May 1922.

SVEN ARTON.